US012611689B2

(12) United States Patent
Zhu et al.

(10) Patent No.: US 12,611,689 B2
(45) Date of Patent: Apr. 28, 2026

(54) METHOD FOR QUICKLY DETERMINING POSITION OF SIGNAL MOUTHPIECE OF SPRAYING EQUIPMENT

(71) Applicant: JiangSu University, Jiangsu (CN)

(72) Inventors: Xingye Zhu, Jiangsu (CN); Yunhao Zheng, Jiangsu (CN); Junping Liu, Jiangsu (CN); Shouqi Yuan, Jiangsu (CN); Yanjun Li, Jiangsu (CN)

(73) Assignee: JiangSu University, Jiangsu (CN)

( * ) Notice: Subject to any disclaimer, the term of this patent is extended or adjusted under 35 U.S.C. 154(b) by 189 days.

(21) Appl. No.: 18/725,140

(22) PCT Filed: Apr. 21, 2022

(86) PCT No.: PCT/CN2022/088077
§ 371 (c)(1),
(2) Date: Jun. 28, 2024

(87) PCT Pub. No.: WO2023/134048
PCT Pub. Date: Jul. 20, 2023

(65) Prior Publication Data
US 2025/0065353 A1 Feb. 27, 2025

(30) Foreign Application Priority Data
Jan. 14, 2022 (CN) ......................... 202210041880.1

(51) Int. Cl.
*B05B 12/08* (2006.01)
*B05B 9/04* (2006.01)

(52) U.S. Cl.
CPC ................ *B05B 12/08* (2013.01); *B05B 9/04* (2013.01); *B05B 12/085* (2013.01)

(58) Field of Classification Search
CPC .. B05B 1/26; B05B 1/267; B05B 9/04; B05B 12/00; B05B 12/02; B05B 12/08; B05B 12/085
(Continued)

(56) References Cited

U.S. PATENT DOCUMENTS 1,138,500 A * 5/1915 Naylor .................... B05B 1/267 239/433
4,018,386 A 4/1977 Barichello
(Continued)

FOREIGN PATENT DOCUMENTS

AU 2005203627 3/2007
CN 101224444 7/2008
(Continued)

OTHER PUBLICATIONS

Xingye Zhu et al., "Compared between outside signal fluidic sprinkler and complete fluidic sprinkler", Journal of Drainage and Irrigation Machinery Engineering, Feb. 2015, with English abstract, pp. 172-178, vol. 33, No. 2.
(Continued)

*Primary Examiner* — Steven J Ganey
(74) *Attorney, Agent, or Firm* — JCIPRNET

(57) ABSTRACT

The present invention is a method for quickly determining the position of a signal mouthpiece of spraying equipment. The spraying equipment includes a bolt, a water intake signal mouthpiece, an outlet cover plate, a sprayer body, a water storage vessel, a scale line, a conduit and a water inlet connecting mouthpiece. The water intake signal mouthpiece is adjusted to a critical point, and a reference position of the water intake signal mouthpiece is marked. The water intake signal mouthpiece is adjusted to obtain a water intake area S1. The conduit is disconnected with a water intake port. The time t1 is recorded, and the flow coefficient μ of the
(Continued)

signal water of the spraying equipment is calculated. M scale lines are drawn equidistantly on the outlet cover plate, and are marked with scales in turn. The optimization of the position of the signal mouthpiece of the spraying equipment is realized.

6 Claims, 3 Drawing Sheets

(58) Field of Classification Search
USPC ... 239/73, 419.5, 428.5, 429, 433, 434, 507, 239/513–515, 589, 589.1
See application file for complete search history.

(56) References Cited

U.S. PATENT DOCUMENTS 5,961,047 A * 10/1999 Kleinberger ............ B05B 7/262 239/433
7,100,844 B2 * 9/2006 McGuire ................... B08B 3/02 239/589
2012/0043397 A1 2/2012 Skripkar et al.
2016/0038956 A1 2/2016 Zhu et al.
2016/0082451 A1 3/2016 Yuan et al.

FOREIGN PATENT DOCUMENTS

CN 101972722 2/2011
CN 103406225 11/2013
CN 203355931 12/2013

OTHER PUBLICATIONS

"International Search Report (Form PCT/ISA/210) of PCT/CN2022/088077", mailed on Jun. 27, 2022, with English translation thereof, pp. 1-6.

* cited by examiner

METHOD FOR QUICKLY DETERMINING POSITION OF SIGNAL MOUTHPIECE OF SPRAYING EQUIPMENT

CROSS-REFERENCE TO RELATED APPLICATION

This application is a 371 of international application of PCT application serial no. PCT/CN2022/088077, filed on Apr. 21, 2022, which claims the priority benefits of China application no. 202210041880.1, filed on Jan. 14, 2022. The entirety of each of the above-mentioned patent applications is hereby incorporated by reference herein and made a part of this specification.

TECHNICAL FIELD

The present invention relates to an optimization method for the structure of spraying equipment, and in particular to a method for quickly determining the position of a signal mouthpiece of spraying equipment.

BACKGROUND

Spraying equipment is a water-saving irrigation device widely used in agricultural irrigation. The stable operating state of the spraying equipment during operation is a state in which a sprayer has a proper speed, a good range, and uniform spraying in a circumference when it is rotated. For the spraying equipment, when a signal mouthpiece intakes more water, the effects of short direct ejection time, fast rotation speed, short range, and good uniformity of the sprayer are obtained; and when the signal mouthpiece of the spraying equipment intakes less water, the effects of long direct ejection time, slow rotation speed, long range, and poor uniformity of the sprayer are obtained. The position of the signal mouthpiece of the current spraying equipment is designed mainly by experience, namely, by mainly observing the direct ejection time, rotation speed, spraying range and spraying uniformity of the sprayer. It is impossible to accurately optimize the design of the direct ejection time, rotation speed, spraying range, and spraying uniformity of the spraying equipment and achieve stable operation of the sprayer, and also it is impossible to accurately know the influence of the position of the signal mouthpiece on the important hydraulic performance. If the spraying equipment cannot complete a stable operation or the important hydraulic performance is poor under some special circumstances, whether this is caused by the position of the signal mouthpiece cannot be analyzed, and thus this scientific problem cannot be effectively solved.

As mentioned above, in the design process, because the design of the position of the signal mouthpiece of the spraying equipment cannot be optimized currently, it is impossible to scientifically set the parameters of the position of the signal mouthpiece to control the direct ejection time, rotation speed, spraying range and spraying uniformity of the sprayer when the spraying equipment has poor important hydraulic performance. For this reason, the present invention proposes a method for quickly determining the position of a signal mouthpiece of spraying equipment to solve the above-mentioned problem.

By retrieval, there is no relevant declared patents at present.

SUMMARY OF INVENTION

To ensure the correctness of the direct ejection time of the spraying equipment during rotation operation, the present invention provides an optimized method for determining the position of a signal mouthpiece of spraying equipment. According to the method proposed by the present invention, an operator can quickly and conveniently adjust the position of the signal mouthpiece to a required appropriate position, for achieving an expected direct ejection time when the spraying equipment sprays.

In the present invention, the above-mentioned technical objective is achieved by the following technical means.

A method for quickly determining the position of a signal mouthpiece of spraying equipment, the spraying equipment comprising a bolt, a water intake signal mouthpiece, an outlet cover plate, a sprayer body, a water storage vessel, a scale line, a conduit and a water inlet connecting mouthpiece. The water storage vessel has a volume of W, and the conduit has an inner diameter of r and a length of l. The method comprises the following steps:

(a) The outlet cover plate is fixedly connected threadably to the sprayer body by means of threaded holes, the water intake signal mouthpiece and the sprayer body are clamped with a bolt to fix the position of the water intake signal mouthpiece, and the coupling position of the water intake signal mouthpiece is fixed by a locking nut a, the water intake signal mouthpiece is disposed outside the outlet cover plate in the vertical position, and the radial position of the water intake signal mouthpiece relative to the outlet cover plate can be adjusted through the bolt. The water intake shape of the water intake signal mouthpiece can be set into arbitrary shape, such as a square, a triangle, a star, a circle and an ellipse.

(b) The rated operating pressure H of the spraying equipment is set, and firstly the water intake signal mouthpiece is enabled to receive the signal water. The locking nut a is loosened, the bolt is loosened, and the water intake signal mouthpiece is moved until the water intake signal mouthpiece is at a critical point where it is completely separated from the outlet cover plate, namely, a critical position where the water intake signal mouthpiece cannot intake the signal water when a sprayer is at the operating pressure H. Because the signal water is not obtained, the spraying equipment cannot complete the rotation operation. The bolt is tightened, and a reference position of the outside of the water intake signal mouthpiece is marked, that is, a reference line corresponding to the outside of the water intake signal mouthpiece is drawn on an upper end of the outlet cover plate, the reference position corresponding to the reference line representing a set position where the water intake signal mouthpiece is at 0.

(c) The locking nut a is loosened, the bolt is loosened, the water intake signal mouthpiece is adjusted to receive the signal water, and a set position where the water intake signal mouthpiece corresponds to the outlet cover plate is obtained, such that the water intake area $S_1$ of the water intake signal mouthpiece is a value, and the set position of the water intake signal mouthpiece is fixed by tightening the bolt and the locking nut a, such that the water intake area $S_1$ remains unchanged during the sprayer operation.

(d) The rated operating pressure H of the spraying equipment is set, the spraying equipment is kept in a stable operating state, and when the spraying equipment cannot be kept in the stable operating state, the step (c) above is repeated. The stable operating state of the spraying equipment is a state in which the sprayer has a proper rotation speed, a good range, and uniform spraying in a circumference. Considering that the spraying equipment may fluctuate and be not stable enough at the beginning of operation, it is necessary to measure the flow of the signal water of the sprayer after stable operation for 10 min or more at the set operating pressure of the sprayer.

(e) The conduit is disconnected with a water intake port, the spraying equipment is kept in a direct ejection state to draw the signal water, the time $t_1$ it takes for the signal water to begin to enter the water storage vessel until it is full is recorded, and the flow of the signal water of the sprayer per unit time $Q_1=W/t_1$ is calculated when the water intake area of the spraying equipment is $S_1$.

The flow coefficient μ of the signal water of the spraying equipment is calculated according to the following formula:

$$Q_1 = \mu S_1 \sqrt{2gH}$$

wherein, $S_1$ is the water intake area of the water intake signal mouthpiece,

H is the operating pressure of the sprayer, and

μ is the flow coefficient of the signal water of the spraying equipment, $\mu=Q_1/S_1\sqrt{2gH}$.

(f) On the basis of obtaining the value of the flow coefficient μ of the signal water of the spraying equipment in the step (e), based on the operating principle of the spraying equipment, and according to the formula:

$$T = \frac{W + \pi r^2 l}{Q_2} = \frac{W + \pi r^2 l}{\mu S_2 \sqrt{2gH}},$$

the water intake area of the signal mouthpiece of the spraying equipment $S_2$ is calculated as $$S_2 = \frac{W + \pi r^2 l}{T\mu\sqrt{2gH}}$$

and then the position of the signal mouthpiece of the spraying equipment is optimized according to an assumed expected direct ejection time T of the spraying equipment.

(g) Based on the water intake shape set by the water intake signal mouthpiece, and the length dimension of the radial position of the water intake signal mouthpiece relative to the outlet cover plate, starting from the reference line on the upper end of the outlet cover plate, and using the mathematical formula corresponding to the set water intake shape, the position of each of scale lines that equally divide the water intake area is calculated, and m scale lines are drawn on the outlet cover plate, such that the water intake area of the water intake signal mouthpiece is divided into m equal parts. The drawn m scale lines are more than or equal to one. The formula for calculating the water intake area of the signal mouthpiece of the spraying equipment is:

$$S_2 = \frac{x-1}{m} S$$

wherein,

S is the total area of the water intake signal mouthpiece;

x is the number of the position of the scale line of the outlet cover plate which the reference line of the signal mouthpiece corresponds to.

(h) the number of the position of the scale line of the outlet cover plate which the reference line of the signal mouthpiece corresponds to is determined:

$$x = \frac{mS_2}{S} + 1 = \frac{m(W + \pi r^2 l)}{ST\mu\sqrt{2gH}} + 1.$$

The locking nut a is tightened to fix the set position of the water intake signal mouthpiece, and the expected direct ejection time T in the step (f) can be obtained, as such, the position of the signal mouthpiece of the spraying equipment can be quickly and conveniently determined.

The present invention has the following advantageous effects:

1. The method for optimizing the position of a signal mouthpiece of spraying equipment described in the present invention is mainly to optimize the position of the signal mouthpiece of the spraying equipment, and has a good effect, with the deviation between a measured direct ejection time after determining the position of the signal mouthpiece of the spraying equipment and a expected direct ejection time being within 10%.
2. By using the reference line and the scale lines in combination, the method for optimizing the position of a signal mouthpiece of spraying equipment described in the present invention has the advantages of being simple, quick and convenient to operate, having a high precision, and being able to determining the optimal position of the signal mouthpiece of the spraying equipment at a lower cost.

Figure 1:
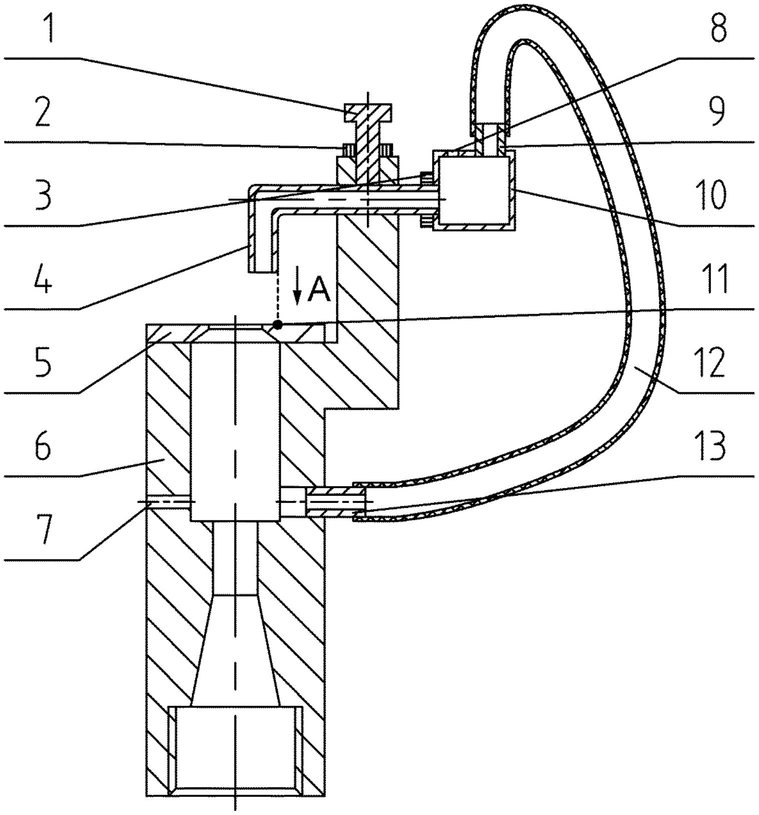
FIG. 1 is a schematic diagram of the key structure of spraying equipment.
Figure 2:
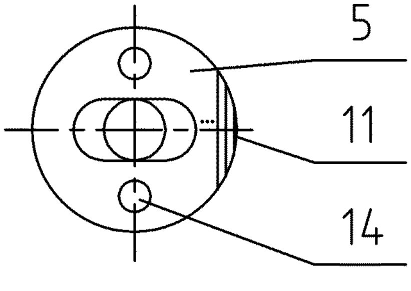
FIG. 2 is a structural view along a direction A in FIG. 1.
Figure 3:
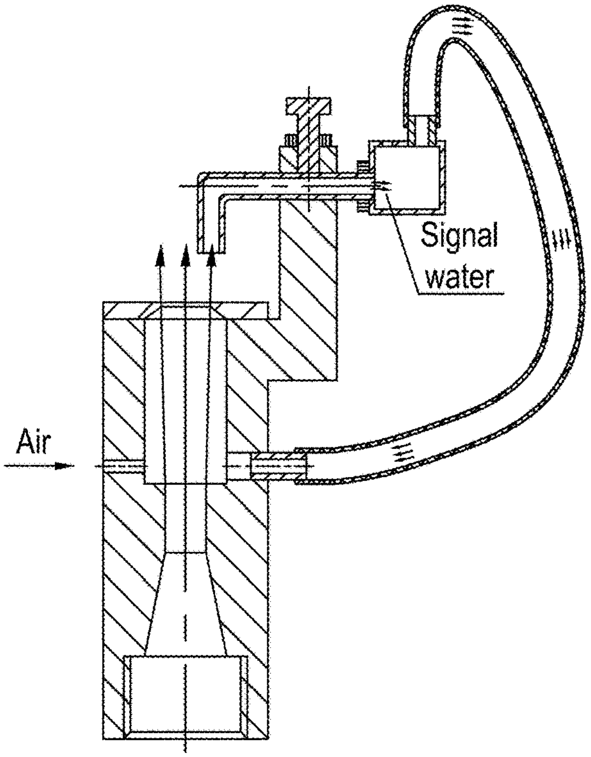
FIG. 3 is a schematic structural diagram of the present invention in a direct ejection state.
Figure 4:
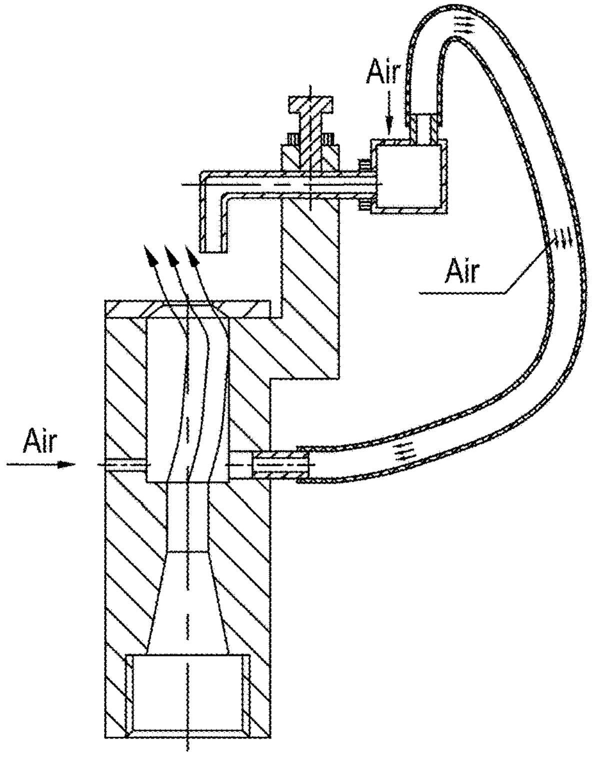
FIG. 4 is a schematic structural diagram of the present invention in a wall attachment state.
Figure 5:
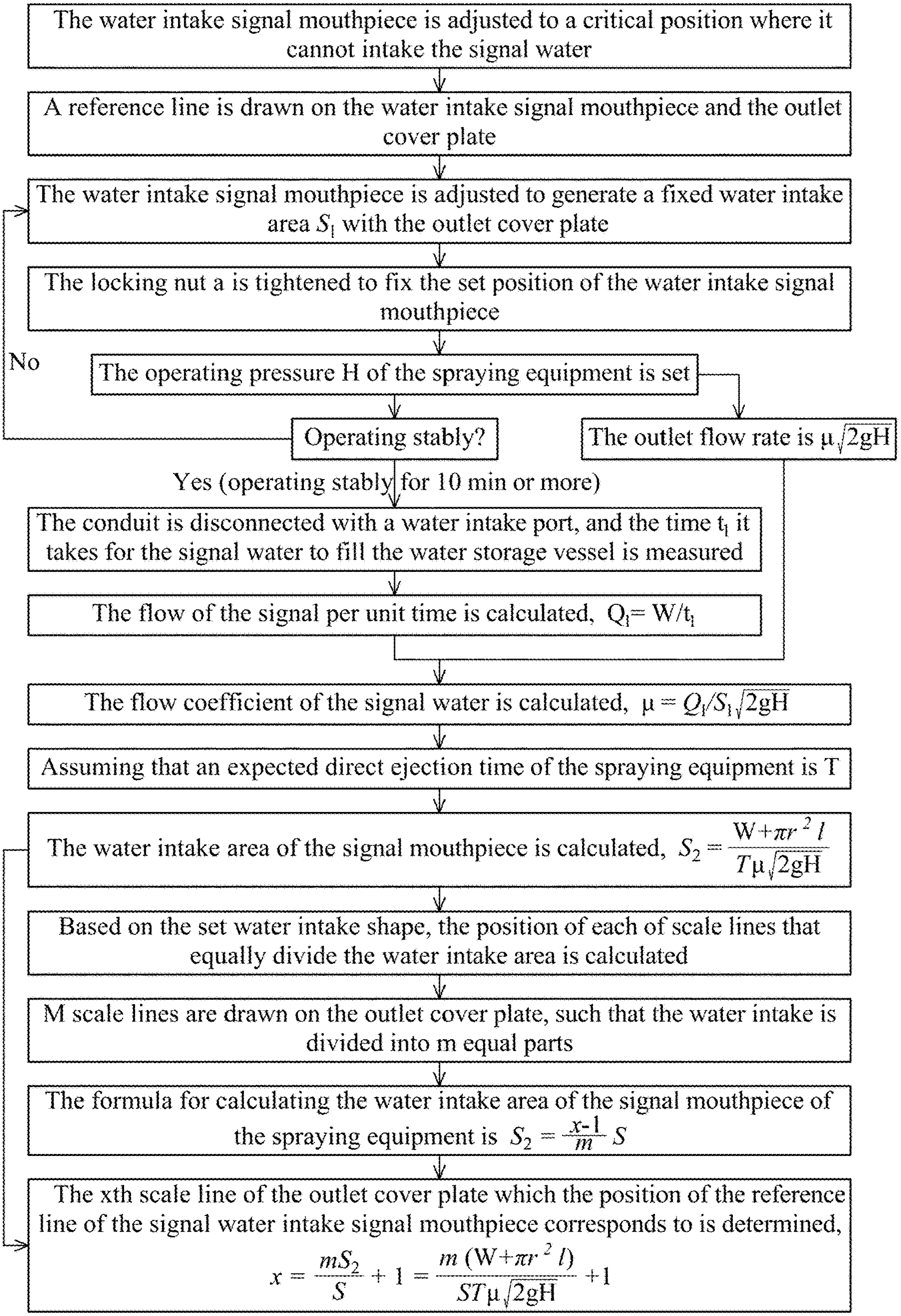
FIG. 5 is a flow chart of steps of a method for optimizing the position of a signal mouthpiece of spraying equipment of the present invention.

In the figures: 1. bolt, 2. locking nut a, 3. locking nut b, 4. water intake signal mouthpiece, 5. outlet cover plate, 6. sprayer body, 7. air supply hole a, 8. air supply hole b, 9. water intake port, 10. water storage vessel, 11. scale line, 12. conduit, 13. water inlet connecting mouthpiece, 14. threaded hole.

DESCRIPTION OF EMBODIMENTS

Implementations of technical solutions in embodiments of the present invention will be described in detail below with reference to the accompanying drawings in the embodiments of the present invention. The embodiments are merely some embodiments for facilitating the interpretation of the present invention and not all of the embodiments, and cannot be construed as limiting the present invention. A method for quickly determining the position of a signal mouthpiece of spraying equipment is described in detail as follows.

The operating principle of the spraying equipment includes both a direct ejection state and a wall attachment state for completing a rotation operation of a sprayer. An operation process is as follows:

In the direct ejection state: a water stream flows out from an outlet of an outlet cover plate 5, a low-pressure vortex area is formed across left and right ends of a sprayer body 6, a signal water is taken by a water intake signal mouthpiece 4 from an outer side of the outlet of the outlet cover plate 5, and the taken signal water fills a water storage vessel 10, and the signal water flows from a water intake port 9 through a conduit 12 to a water inlet connecting mouthpiece 13 of the sprayer. At this point, the pressures on left and right sides of the sprayer body are substantially equal, a main jet is in a direct ejection state, and the sprayer is still.

In the wall attachment state: the signal water taken out by the water intake signal mouthpiece 4 flows through the water storage vessel 10 and the conduit 12 and into the water inlet connecting mouthpiece 13 of the sprayer, such that a low-pressure vortex area is created on the right side. A pressure difference is formed between the left and right sides of the sprayer body, and the pressure on the left side is greater than that on the right side. The main jet is attached to a wall to the right side. The water flow generates a driving force on the sprayer body 6 by chamfering of the outlet cover plate 5, such that the sprayer is rotated step by step to the right side to complete the rotation operation. At this point, because the water flow is attached to the wall to the right side, the water flow is deflected to the left side at the outlet by the chamfering of the outlet cover plate 5, and the water intake signal mouthpiece 4 is empty and cannot intake any signal water, but only receives air.

In the wall attachment state of the main jet, the signal water in the water storage vessel 10 and the conduit 12 is quickly pumped out. After the signal water in the water storage vessel 10 is pumped out, the air enters the air supply hole b 8, the pressures on the left and right sides of the sprayer body are equal, and the main jet returns to the direct ejection state. The process is repeated in this way, and the spraying equipment automatically completes the action of direct ejection-stepping-direct ejection- . . . , to realize the rotation operation of full-circle spraying.

Important structural parameters of the spraying equipment to realize full-circle spraying include the position of the signal water, the volume W of the water storage vessel, and the inner diameter r and the length l of the conduit. The rotation speed of the spraying equipment mainly depends on a direct ejection time and a wall attachment time. In the actual operation process, in the wall attachment state, due to the large pressure difference between the left and right sides of the main jet, the speed of the signal water is fast, and the wall attachment time is short and can be ignored, so it is considered that the rotation speed of the spraying equipment is mainly determined by the direct ejection time.

As shown in FIG. 1, if the volume W of the water storage vessel (10) is 15 ml, the inner diameter r of the conduit (12) is 4 mm, and the length l thereof is 150 mm. The water intake shape of the water intake signal mouthpiece (4) is set to a square of 2 mm×10 mm. The rated operating pressure H of the spraying equipment is set to 0.2 MPa, and the water intake signal mouthpiece (4) is adjusted to a critical position where it cannot intake the signal water. At this point, a reference line is drawn on the outer side of the water intake signal mouthpiece (4) and on an upper end of the outlet cover plate (5) to represent a set position of 0 degree. The water intake signal mouthpiece (4) is adjusted to receive the signal water, and the set position where a water intake area of the water intake signal mouthpiece (4) corresponding to the outlet cover plate (5) is 2 mm×7 mm is obtained, such that the water intake area $S_1$ of the water intake signal mouthpiece (4) is 14 mm$^2$. The set position of the water intake signal mouthpiece (4) is fixed by tightening a bolt (1) and a locking nut a (2). The operating pressure of the sprayer is set to 0.2 MPa, i.e., a water head of 20 m, and the spraying equipment is kept in a stable operating state. After stable operation for 20 min, the conduit (12) is disconnected with the water intake port (9). The time $t_1$ it takes for the signal water to begin to enter the water storage vessel (10) until it is full is measured to be 1.5 s, and the flow $Q_1$ of the signal water of the sprayer per unit time is calculated to be 10 ml/s. The flow coefficient μ of the signal water of the spraying equipment is calculated to be 0.0357.

On the basis of obtaining the flow coefficient μ of the signal water of the spraying equipment of 0.0357, and with the operating pressure of 0.2 MPa, 20 scale lines other than the reference line are drawn equidistantly in the range of the outlet cover plate and are marked the scales in order. The spacing between every two scale lines is 0.5 mm. It is assumed that an expected direct ejection time T of the spraying equipment is 1.3, 1.6, 1.9, 2.2 and 2.5 s, respectively, and the position of the signal mouthpiece of the spraying equipment is optimized. The results of the optimization of the position of the signal mouthpiece and the comparison between the measured and expected direct ejection times are shown in the table below.

| Assumed expected direct ejection time (in seconds) | Position of the signal mouthpiece (the scale line number from the reference line) | Spraying range (in meters) | Spraying uniformity (in %) | Measured direct ejection time (in seconds) | Deviation between the measured and expected direct ejection times (in %) |
|---|---|---|---|---|---|
| 1.3 | 19 | 7.8 | 89 | 1.26 | 3.1 |
| 1.6 | 16 | 8.2 | 87 | 1.74 | 8.8 |
| 1.9 | 13 | 9.5 | 84 | 1.88 | 1.1 |
| 2.2 | 11 | 11.0 | 80 | 2.34 | 6.4 |
| 2.5 | 10 | 11.7 | 75 | 2.68 | 7.2 |

As shown in the above table, in the method for quickly determining the position of the signal mouthpiece of the spraying equipment proposed by the present invention, the deviation between the actually measured direct ejection time and the expected direct ejection time is within 10%. Therefore, the present invention has the advantages of being simple, quick and convenient to operate, having a high precision, being able to achieving the optimization of the position of the signal mouthpiece of the spraying equipment at a lower cost, etc.

The described embodiments are preferred implementations of the present invention, and are only for the purpose of illustrating the technical ideas of the present invention. However, the present invention is not limited to the above-mentioned implementations. Any obvious improvements, replacements or variations that can be made by those of skill in the art shall fall within the scope of protection of the invention without deviating from the technical ideas and substance of the present invention.

What is claimed is:

1. A method for quickly determining a position of a signal mouthpiece of spraying equipment, the spraying equipment mainly comprising a bolt (1), a water intake signal mouthpiece (4), an outlet cover plate (5), a sprayer body (6), a water storage vessel (10), a scale line (11), a conduit (12) and a water inlet connecting mouthpiece (13), the method for determining the position of the signal mouthpiece comprising the following steps:

(a) the outlet cover plate (5) is fixedly connected threadably to the sprayer body (6) by means of threaded holes (14), the water intake signal mouthpiece (4) and the sprayer body (6) are clamped with the bolt (1) to determine the position of the water intake signal mouthpiece (4), and a coupling position of the water intake signal mouthpiece (4) is fixed by a locking nut a (2), the water intake signal mouthpiece (4) is disposed outside the outlet cover plate (5) in a vertical position, and a radial position of the water intake signal mouthpiece (4) relative to the outlet cover plate (5) can be adjusted through the bolt (1);

(b) a rated operating pressure H of the spraying equipment is set, and firstly, the water intake signal mouthpiece (4) is enabled to receive a signal water, the locking nut a (2) is loosened, the bolt (1) is loosened, and the water intake signal mouthpiece (4) is moved until the water intake signal mouthpiece (4) is at a critical point where it is completely separated from the outlet cover plate (5), namely, a critical position where the water intake signal mouthpiece (4) cannot intake the signal water when a sprayer is at the operating pressure H, the bolt (1) is tightened, and a reference position of the outside of the water intake signal mouthpiece (4) is marked, that is, a reference line corresponding to the outside of the water intake signal mouthpiece (4) is drawn on an upper end of the outlet cover plate (5), the reference position corresponding to the reference line representing a set position where the water intake signal mouthpiece (4) is at 0;

(c) the locking nut a (2) is loosened, the bolt (1) is loosened, the water intake signal mouthpiece (4) is adjusted to receive the signal water, and the set position where the water intake signal mouthpiece (4) corresponds to the outlet cover plate (5) is obtained, such that a water intake area S1 of the water intake signal mouthpiece (4) is a value, and the set position of the water intake signal mouthpiece (4) is fixed by tightening the bolt (1) and the locking nut a (2), such that the water intake area S1 remains unchanged during a sprayer operation;

(d) the rated operating pressure H of the spraying equipment is set, the spraying equipment is kept in a stable operating state, and when the spraying equipment cannot be kept in the stable operating state, the step (c) above is repeated;

(e) the conduit (12) is disconnected with a water intake port (9), the spraying equipment is kept in a direct ejection state to draw the signal water, a time tl it takes for the signal water to begin to enter the water storage vessel (10) until it is full is recorded, and a flow of the signal water of the sprayer per unit time Q1=W/t1 is calculated when the water intake area of the spraying equipment is S1; and a flow coefficient μ of the signal water of the spraying equipment is calculated according to the following formula:

$$Q_1 = \mu S_1 \sqrt{2gH}$$

wherein,

S1 is the water intake area of the water intake signal mouthpiece,

H is the operating pressure of the sprayer,

μ is the flow coefficient of the signal water of the spraying equipment, $\mu = Q_1/S_1\sqrt{2gH}$; (f) on the basis of obtaining the value of the flow coefficient μ of the signal water of the spraying equipment in the step (e), based on a operating principle of the spraying equipment, and according to a formula:

$$T = \frac{W + \pi r^2 l}{Q_2} = \frac{W + \pi r^2 l}{\mu S_2 \sqrt{2gH}},$$

a water intake area of the signal mouthpiece of the spraying equipment $S_2$ is calculated as $$S_2 = \frac{W + \pi r^2 l}{T\mu\sqrt{2gH}}$$

and then the position of the signal mouthpiece of the spraying equipment is optimized according to an assumed expected direct ejection time T of the spraying equipment;

(g) based on a length dimension of the water intake port of the water intake signal mouthpiece (4), starting from the reference line on the upper end of the outlet cover plate (5), m scale lines are drawn equidistantly on the outlet cover plate (5), such that the water intake area of the water intake signal mouthpiece (4) is divided into m equal parts; and a formula for calculating the water intake area of the signal mouthpiece of the spraying equipment is:

$$S_2 = \frac{x - 1}{m} S$$

wherein,

S is a total area of the water intake signal mouthpiece, and x is a number of the position of the scale line of the outlet cover plate which the reference line of the signal mouthpiece corresponds to; and (h) the number of the position of the scale line of the outlet cover plate which the reference line of the signal mouthpiece corresponds to is determined:

$$x = \frac{mS_2}{S} + 1 = \frac{m(W + \pi r^2 l)}{ST\mu\sqrt{2gH}} + 1$$

the locking nut a (2) is tightened to fix the set position of the water intake signal mouthpiece (4), and the expected direct ejection time T in the step (e) can be obtained, as such, the position of the signal mouthpiece of the spraying equipment can be quickly and conveniently determined.

2. The method for quickly determining the position of a signal mouthpiece of spraying equipment according to claim 1, wherein: the water storage vessel (10) has a volume of W, and the conduit (12) has an inner diameter of r and a length of l.

3. The method for quickly determining the position of a signal mouthpiece of spraying equipment according to claim 1, wherein: a water intake shape of the water intake signal mouthpiece (4) can be set into any shape of a square, a triangle, a star, a circle and an ellipse.

4. The method for quickly determining the position of a signal mouthpiece of spraying equipment according to claim 1, wherein: the stable operating state of the spraying equipment is a state in which the sprayer has a proper rotation speed, a good range, and uniform spraying in a circumference.

5. The method for quickly determining the position of a signal mouthpiece of spraying equipment according to claim 1, wherein: the flow of the signal water of the sprayer is measured after stable operation for 10 min under the set operating pressure of the sprayer.

6. The method for quickly determining the position of a signal mouthpiece of spraying equipment according to claim 1, wherein: the m scale lines drawn equidistantly are more than or equal to one.

* * * * *